United States Patent [19]

Takagi et al.

[11] Patent Number: 5,160,522
[45] Date of Patent: Nov. 3, 1992

[54] METHOD FOR PRODUCING PREFORM FOR POLARIZATION RETAINING OPTICAL FIBER

[75] Inventors: Masahiro Takagi; Hiroshi Suganuma; Hiroo Kanamori, all of Yokohama, Japan

[73] Assignee: Sumitomo Electric Industries, Ltd., Osaka, Japan

[21] Appl. No.: 241,043

[22] Filed: Aug. 6, 1991

[30] Foreign Application Priority Data

Aug. 9, 1990 [JP] Japan .................................. 2-212303
Aug. 9, 1990 [JP] Japan .................................. 2-212304

[51] Int. Cl.⁵ .......................................... C03B 37/012
[52] U.S. Cl. .......................................... 65/3.11; 65/2; 65/3.2; 385/11
[58] Field of Search ............... 65/3.11, 3.2, 2; 385/11, 123, 1

[56] References Cited

U.S. PATENT DOCUMENTS

| | | | |
|---|---|---|---|
| 4,698,084 | 10/1987 | Severijns | 65/3.11 |
| 4,810,277 | 3/1989 | Waitl | 65/3.11 |
| 4,812,154 | 3/1989 | Yoshida | 65/3.2 |

FOREIGN PATENT DOCUMENTS

| | | | |
|---|---|---|---|
| 0147225 | 7/1985 | European Pat. Off. | |
| 53-144348 | 12/1978 | Japan | 65/2 |
| 58-036941 | 3/1983 | Japan | |
| 60-246236 | 12/1985 | Japan | 65/3.11 |
| 1153551 | 6/1989 | Japan | |

*Primary Examiner*—Kenneth M. Schor
*Attorney, Agent, or Firm*—Cushman, Darby & Cushman

[57] ABSTRACT

A preform for a polarization retaining optical fiber is produced by making at least two bores symmetrically around a center axis of a preform comprising a core part and a cladding part which surrounds the core part, decreasing a diameter of one end of each bore, or connecting a glass tube to one end of the preform, the glass tube having a part with a smaller inner diameter near its end which is connected to the preform, inserting a first glass rod, a stressing member and a second glass rod in this order from the other end of each bore or from an end of each bore which is remote from the connected glass tube, contacting the first glass rod to the diameter-decreased end of each bore or to the part with a smaller inner diameter of the glass tube, and heating and fusing the second glass rod to the preform.

3 Claims, 2 Drawing Sheets

METHOD FOR PRODUCING PREFORM FOR POLARIZATION RETAINING OPTICAL FIBER

BACKGROUND OF THE INVENTION

1. Field of the Invention

The present invention relates to a method for producing a preform for a polarization retaining optical fiber which is used in an optical fiber laser or an optical fiber light amplifier.

2. Description of the Related Art

As a method for producing a preform for a polarization retaining optical fiber, Japanese Patent Kokai Publication No. 155535/1985 discloses a method comprising boring at least two bores which are symmetrically arranged around a center axis of a preform for use in the fabrication of an optical fiber, smoothening inner surfaces of the bores, and inserting and fixing a stressing members having a different coefficient of thermal expansion from that of a core and cladding parts of the preform in the bores. The stressing member is fixed in the bore by making an outer diameter of one end of the bore larger than an inner diameter of the bore and inserting and fixing said one end of the stressing member to an end opening of the bore.

In general, since a material of the stressing member has a very much different coefficient of thermal expansion from that of the material of the preform for the optical fiber, the stressing member deforms much larger than the preform material when they are heated to integrate them together.

In the above conventional fixing manner, since the whole stressing member is not completely fixed to the preform though the one end of the stressing member is inserted in the bore, an unfixed part of the stressing member deforms largely, so that the stressing member moves during the integration of the stressing member and the preform and drawing of the preform having the stressing members. As the result, a desired stress is not achieved in the drawn fiber and no good polarization retaining property is realized because of the decrease of the diameter of the stressing member or deformation of the stressing member.

SUMMARY OF THE PRESENT INVENTION

An object of the present invention is to provide a method for producing a preform for a polarization retaining optical fiber, by which both ends of a stressing member can be fixed to a respective bore made in the preform, whereby the deformation of the stressing member during the integration step is minimized and the desired stress is achieved in a finally fabricated polarization retaining optical fiber.

According to the present invention, there is provided a method for producing a preform for a polarization retaining optical fiber which comprises steps of:

making at least two bores symmetrically around a center axis of a preform comprising a core part and a cladding part which surrounds the core part, decreasing a diameter of one end of each bore, or connecting a glass tube to one end of said preform, said glass tube having a part with a smaller inner diameter near its end which is connected to said preform, inserting a first glass rod, a stressing member and a second glass rod in this order from the other end of each bore or from an end of each bore which is remote from said connected glass tube, contacting said first glass rod to said diameter-decreased end of each bore or to said part with a smaller inner diameter of said glass tube, and heating and fusing said second glass rod to said preform.

DETAILED DESCRIPTION OF THE DRAWINGS

Figure 1:
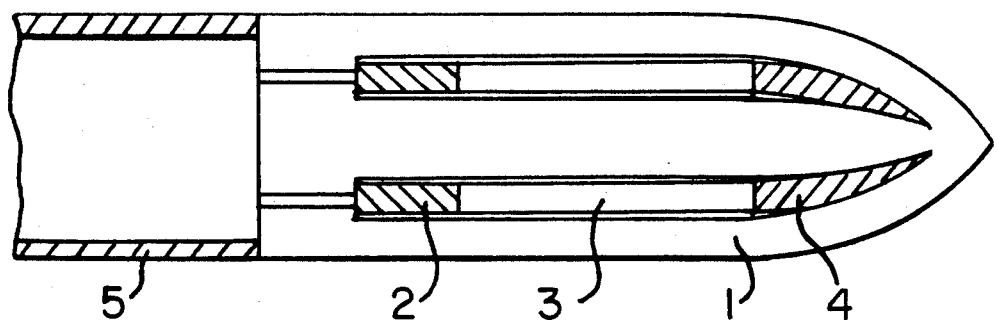
FIG. 1 is a cross sectional view of one example of a first embodiment of the preform for the polarization retaining optical fiber.

In a first embodiment, one end of each bore has a smaller diameter than the rest of the bore, and, from the other end of the bore, the first glass rod, the stressing member and the second glass rod are inserted in this order.

In a second embodiment, a glass tube is connected to one end of the preform, and this glass tube has a part with a smaller inner diameter near its end which is connected to the preform. Then, from an end of each bore which is remote from the preform end to which the glass tube is connected, the first glass rod, the stressing member and the second glass rod are inserted in this order.

The part with the smaller inner diameter may be formed by heating this part of the glass tube, stretching this part and then pressing the stretched part, whereby the inner diameter of the part is decreased while the outer diameter of the part is made substantially the same as the outer diameter of the rest of the glass tube. Alternatively, to both ends of a short glass tube having a smaller inner diameter, glass tubes having a larger inner diameter than and the same outer diameter as the short glass tube are connected to form the glass tube having the smaller diameter part.

Preferably, the first and second glass rods are made of glass having substantially the same coefficient of thermal expansion as that of glass to be used for forming the cladding part of the preform.

In addition, a softening point of the first and second glass rods is preferably substantially the same as or higher than a softening point of the glass to be used for forming the cladding part of the preform.

According to the present invention, the stressing member is sandwiched by the first and second glass rods, and the both ends of the stressing member are fixed by the glass rods. Therefore, the deformation of the stressing members can be minimized during heating for integrating the stressing members and the preform together. When the resulting preform is heated and drawn to fabricate the polarization retaining optical fiber, the fabricated optical fiber has better accuracy since the both ends of the stressing member are fixed.

For fixing the ends of the stressing member, it may be contemplated to insert the stressing member in the bore and then the glass rods are connected to the respective ends of the preform. However, in the connection step, an interior space of the bore is contaminated with impurities so that the fabricated optical fiber tends to have decreased strength.

It may be also contemplated to integrate the stressing member and the preform in the step of the formation of the preform. However, the integrated preform may be cracked due to large difference of the coefficient of thermal expansion between the preform glass and the stressing member.

Since impurities in the bore should be removed prior to the fixing of the stressing member, the bore should be passed through after the first and second glass rods and the stressing member are inserted in the bore.

According to the present invention, since the core can be passed through after the insertion of the stressing member and the glass rods, the impurities can be removed from the bore even after the insertion of the stressing member and the glass rods. Since the stressing member and the preform are not integrated together, the final preform does not tend to be cracked.

In view of the above, each glass rod preferably has substantially the same coefficient of thermal expansion as that of the glass to be used for the formation of the cladding part.

To prevent the deformation of the stressing member during the integration step and the drawing of the preform, the first and the second glass rods have a softening point which is substantially the same as or higher than that of the glass to be used for the formation of the cladding.

The present invention will be explained by making reference to the accompanying drawings.

FIG. 1 is a cross sectional view of an example of the preform to be produced by the first embodiment of the method according to the present invention. In FIG. 1, a preform 1 for an optical fiber contains a first glass rod 2, a stressing member 3 and a second glass rod. To one end of the preform, a glass tube 5 is connected for easy handling.

First, in the preform 1 from one end to a position before the other end of the preform, at least two bores each having an inner diameter slightly larger than an outer diameter of the stressing member 3 are formed, and from the above position to the other end, a bore having a smaller inner diameter than the outer diameter of the stressing member 3 is formed. After fusing the glass tube 5 to the other end of the preform, the glass rod 2, the stressing member 3 and the second glass rod 4 are inserted in each bore from the one end thereof. The first glass rod is pressed against the bore part having the smaller diameter and fixed. To the glass tube 5, a vacuum connector may be attached.

After removing the impurities from the bore interiors, the one end of the preform is fused with a flame so as to fix the second glass rod to the preform. The right side of the preform of FIG. 1 shows the fused state.

The free end (not shown) of the glass tube 5 is collapsed after reducing the pressure in the tube 5.

By the above steps, the preform for the polarization retaining optical fiber is produced.

Figure 2:
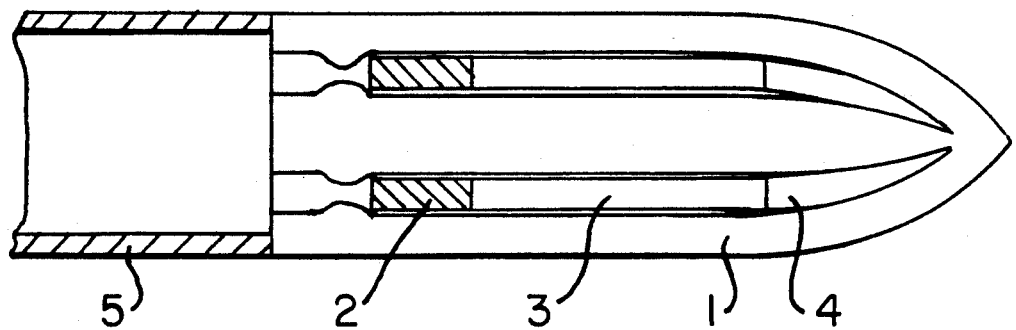
FIG. 2 is a cross sectional view of another example of a first embodiment of the preform for the polarization retaining optical fiber.

FIG. 2 is a cross sectional view of another example of the preform to be produced by the first embodiment of the method according to the present invention. In this example, a part of the bore near the other end of the preform is narrowed down. Such bore can be formed by forming a bore having the same inner diameter from the one end to the other of the preform 1 and the part to be narrowed down is heated and softened while slightly pressing the preform in its longitudinal direction. Other features in this example are the same as explained above.

Figure 3:
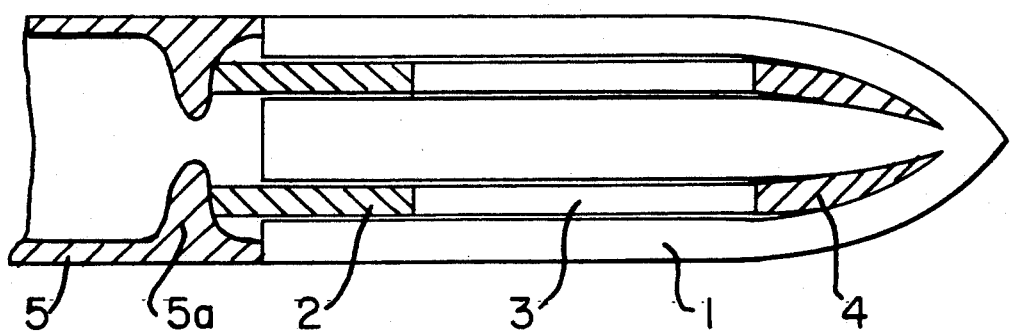
FIG. 3 is a cross sectional view of one example of a second embodiment of the preform for the polarization retaining optical fiber.

FIG. 3 is a cross sectional view of an example of the preform to be produced by the second embodiment of the method according to the present invention.

In this example, the glass tube 5 has a part 5a with a smaller diameter than the rest of the glass tube, and each bore has the same inner diameter from the one end to the other of the preform 1.

The narrow part 5a may be formed by fusing the glass tube 5 to the preform, heating only the part 5a, stretching it and then pressing the softened part 5a. Alternatively, the glass tube 5 having the narrow part 5a may be connected to the preform.

Thereafter, from the other end of the preform, the first glass rod 2, the stressing member 3 and the second glass rod 4 are inserted in each bore. The first glass rod 2 is pressed against the narrow part 5a of the glass tube 5 having the smaller diameter and fixed. To the glass tube 5, a vacuum connector may be attached.

After removing the impurities from the bore interiors, the one end of the preform is fused with a flame so as to fix the second glass rod to the preform. The right side of the preform of FIG. 3 shows the fused state.

The free end (not shown) of the glass tube 5 is collapsed after reducing the pressure in the tube 5.

By the above steps, the preform for the polarization retaining optical fiber is produced.

Figure 4:
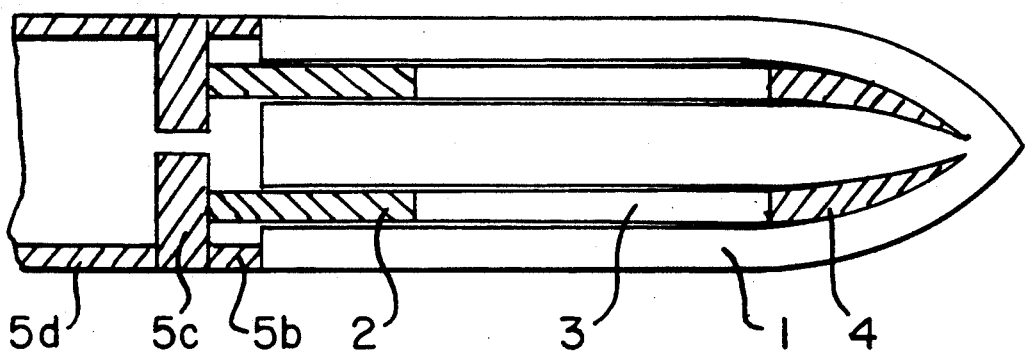
FIG. 4 is a cross sectional view of another example of a second embodiment of the preform for the polarization retaining optical fiber.

Alternatively, as shown in FIG. 4, the narrow part 5a can be formed by connecting, to both ends of a short glass tube 5c having a smaller inner diameter, glass tubes 5b and 5d each having a larger inner diameter than and the same outer diameter as the short glass tube 5c to form the glass tube 5 having the smaller diameter part 5c. The glass tubes 5b, 5c and 5d may be connected to the preform 1 in this order.

Further, it may be possible to fuse a glass ring to the inner wall of the glass tube 5 to form the narrow part 5a.

The present invention will be illustrated by the following Examples.

EXAMPLE 1

In this example, the preform of FIG. 1 was produced.

Through a preform 1 for an optical fiber which consisted of a core part made of $GeO_2$—$SiO_2$ glass and a cladding part made of $SiO_2$ glass and had an outer diameter of 25 mm and a length of 300 mm, two bores each having an inner diameter of 8 mm and center axis apart from each other by 5.0 mm were formed in parallel with the center axis of the preform 1 till a point which was 280 mm apart from one end of the preform 1. From this point, bores each having an inner diameter of 3 mm and a length of 20 mm were formed.

After polishing inner surfaces of the bores having the inner diameter of 8 mm, to each end of the preform 1, a quartz tube 5 having an outer diameter of 25 mm and an inner diameter of 23 mm was respectively connected. Since FIG. 1 shows the fused preform, the right end of the preform has no glass tube 5.

From a free end of each bore having the inner diameter of 8 mm, a first quartz rod 2 having an outer diameter of 7.8 mm and a length of 20 mm, a stressing member 3 made of $B_2O_3$—$SiO_2$ glass and having an outer diameter of 7.8 mm and a length of 200 mm and a second quartz glass rod 4 having an outer diameter of 7.8 mm and a length of 60 mm were inserted in each bore in this order.

The front end of the first quartz rod 2 was contacted to the boundary between the bores having the different inner diameters and fixed.

After removing impurities from the interiors of the bores, the second quartz rod 4 and the preform 1 were heated with a flame and stretched to integrate them together to fix the second quartz rod 4 to the preform 1, whereby the end of each bore was sealed. Then, the interiors of the bores were evacuated and the free end of the glass tube 5 was fused and sealed to obtain a preform for a polarization retaining optical fiber.

The produced preform was heated with a resistance furnace and drawn to fabricate an optical fiber having an outer diameter of 125 μm while integrating the stressing member with the cladding part.

The cross sectional structure of the fabricated optical fiber was measured to find that the outer diameter of the stressing member was 41 μm which was substantially the same as a designed size. The optical fiber had a good birefringence of $5 \times 10^{-4}$ at a wavelength of 0.85 μm. In addition, a cross talk per 1 km was −25 dB at a wavelength of 0.85 μm.

EXAMPLE 2

In this example, the preform of FIG. 2 was produced.

Through a preform 1 for an optical fiber which of a core part made of $GeO_2$—$SiO_2$ glass and a cladding part made of $SiO_2$ glass and had an outer diameter of 25 mm and a length of 300 mm, two bores each having an inner diameter of 8 mm and center axis apart from each other by 5.0 mm were formed in parallel with the center axis of the preform 1 throughout the preform. After polishing inner surfaces of the bores, one end of the preform was heated, stretched and then shrunk to decrease the inner diameter of a part of each bore to about 4 mm.

To each end of the preform 1, a quartz tube 5 having an outer diameter of 25 mm and an inner diameter of 23 mm was respectively connected.

From a free end of each bore, a first quartz rod 2 having an outer diameter of 7.7 mm and a length of 20 mm, a stressing member 3 made of $B_2O_3$—$SiO_2$ glass and having an outer diameter of 7.8 mm and a length of 200 mm and a second quartz glass rod 4 having an outer diameter of 7.7 mm and a length of 60 mm were inserted in each bore in this order.

The front end of the first quartz rod 2 was contacted to the inner wall of the part of the bore having the decreased inner diameter.

After removing impurities from the interiors of the bores, the second quartz rod 4 and the preform 1 were heated with a flame and stretched to integrate them together to fix the second quartz rod 4 to the preform 1, whereby the end of each bore was sealed. Then, the interiors of the bores were evacuated and the free end of the glass tube 5 was fused and sealed to obtain a preform for a polarization retaining optical fiber.

The produced preform was heated with a resistance furnace and drawn to fabricate an optical fiber having an outer diameter of 125 μm while integrating the stressing member with the cladding part.

The cross sectional structure of the fabricated optical fiber was measured to find that the outer diameter of the stressing member was 39 μm which was substantially the same as a designed size. The optical fiber had a good birefringence of $5 \times 10^{-4}$ at a wavelength of 0.85 μm. In addition, a cross talk per 1 km was −27 dB at a wavelength of 0.85 μm.

EXAMPLE 3

In this example, the preform of FIG. 3 was produced.

Through a preform 1 for an optical fiber which consisted of a core part made of $GeO_2$—$SiO_2$ glass and a cladding part made of $SiO_2$ glass and had an outer diameter of 25 mm and a length of 300 mm, two bores each having an inner diameter of 8 mm and center axis apart from each other by 5.0 mm were formed in parallel with the center axis of the preform 1 throughout the preform.

After polishing inner surfaces of the bores having the inner diameter of 8 mm, to each end of the preform 1, a quartz tube 5 having an outer diameter of 25 mm and an inner diameter of 23 mm was respectively connected. Since FIG. 3 shows the fused preform, the right end of the preform has no glass tube 5.

The left side glass tube 5 was heated at a part 5a near the preform and stretched and then pressed to form a part 5a having a reduced inner diameter.

From an end of each bore on the side of the glass tube an inner diameter was not reduced, a first quartz rod 2 having an outer diameter of 7.8 mm and a length of 60 mm, a stressing member 3 made of $B_2O_3$—$SiO_2$ glass and having an outer diameter of 7.8 mm and a length of 200 mm and a second quartz glass rod 4 having an outer diameter of 7.8 mm and a length of 60 mm were inserted in each bore in this order.

The front end of the first quartz rod 2 was contacted to the part 5a of the glass tube 5 and fixed.

After removing impurities from the interiors of the bores, the second quartz rod 4 and the preform 1 were heated with a flame and stretched to integrate them together to fix the second quartz rod 4 to the preform 1, whereby the end of each bore was sealed. Then, the interiors of the bores were evacuated and the free end of the glass tube 5 was fused and sealed to obtain a preform for a polarization retaining optical fiber.

The produced preform was heated with a resistance furnace and drawn to fabricate an optical fiber having an outer diameter of 125 μm while integrating the stressing member with the cladding part.

The cross sectional structure of the fabricated optical fiber was measured to find that the outer diameter of the stressing member was 40 μm which was the same as a designed size. The optical fiber had a good birefringence of $5 \times 10^{-4}$ at a wavelength of 0.85 μm. In addition, a cross talk per 1 km was −26 dB at a wavelength of 0.85 μm.

EXAMPLE 4

In this example, the preform of FIG. 4 was produced.

Through a preform 1 for an optical fiber which consisted of a core part made of $GeO_2$—$SiO_2$ glass and a cladding part made of $SiO_2$ glass and had an outer diameter of 25 mm and a length of 300 mm, two bores each having an inner diameter of 8 mm and center axis apart from each other by 5.0 mm were formed in parallel with the center axis of the preform 1 throughout the preform.

After flame polishing inner surfaces of the bores having the inner diameter of 8 mm, to one end of the preform 1, a quartz tube 5 consisting of a quartz tube 5c having an outer diameter of 25 mm and an inner diameter of 10 mm and a pair of quartz tubes 5b, 5d each having an outer diameter of 25 mm and an inner diameter of 23 mm which were connected to the both sides of the tube 5c was connected, and to the other end of the preform 1, a quartz tube 5 having an outer diameter of 25 mm and an inner diameter of 23 mm was connected.

From an end of each bore on the side of the single piece glass tube 5, a first quartz rod 2 having an outer diameter of 7.7 mm and a length of 70 mm, a stressing member 3 made of $B_2O_3$—$SiO_2$ glass and having an outer diameter of 7.8 mm and a length of 200 mm and a second quartz glass rod 4 having an outer diameter of 7.7 mm and a length of 60 mm were inserted in each bore in this order.

The front end of the first quartz rod 2 was contacted to the glass tube 5c having the smaller inner diameter and fixed.

The second quartz rod 4 and the preform 1 were heated with a flame and stretched to integrate them together to fix the second quartz rod 4 to the preform 1, whereby the end of each bore was sealed. Then, the interiors of the bores were evacuated and the free end of the glass tube 5d was fused and sealed to obtain a preform for a polarization retaining optical fiber.

The produced preform was heated with a resistance furnace and drawn to fabricate an optical fiber having an outer diameter of 125 $\mu$m while integrating the stressing members with the cladding part.

When the cross sectional structure of the fabricated optical fiber was measured to find that the outer diameter of the stressing member was 39 $\mu$m which was substantially the same as a designed size. The optical fiber had a good birefringence of $5 \times 10^{-4}$ at a wavelength of 0.85 $\mu$m. In addition, a cross talk per 1 km was $-27$ dB at a wavelength of 0.85 $\mu$m.

COMPARATIVE EXAMPLE 1

Figure 5:
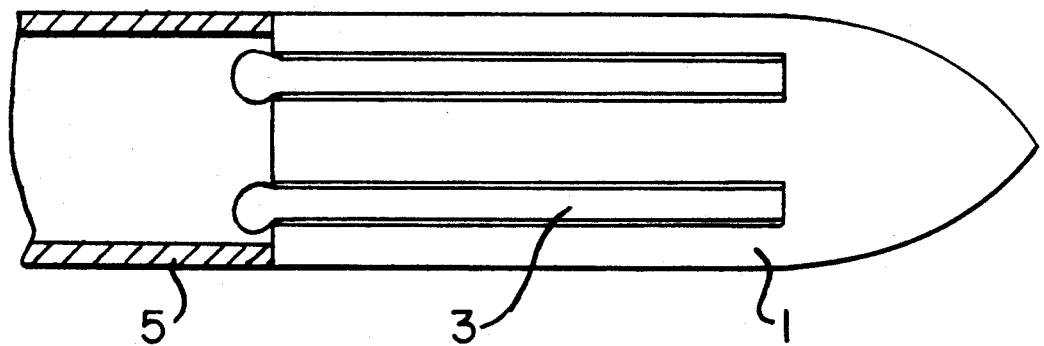
FIGS. 5 and 6 are cross sectional views of a comparative preform for the polarization retaining optical fiber before and after drawing the optical fiber, respectively.

FIG. 5 shows a cross sectional view of a preform for a polarization retaining optical fiber produced by a conventional method.

Through a preform 1 for an optical fiber which consisted of a core part made of $GeO_2$—$SiO_2$ glass and a cladding part made of $SiO_2$ glass and had an outer diameter of 25 mm and a length of 300 mm, two bores each having an inner diameter of 8 mm and center axis apart from each other by 5.0 mm were formed in parallel with the center axis of the preform 1 till a point which was 250 mm apart from one end of the preform 1. That is, the bores did not open at the other end of the preform as shown in FIG. 5.

After polishing inner surfaces of the bores having the inner diameter of 8 mm, to an end of the preform 1 at which the bores opened, a quartz tube 5 having an outer diameter of 25 mm and an inner diameter of 23 mm was connected.

From a free end of each bore having the inner diameter of 8 mm, a stressing member 3 made of $B_2O_3$—$SiO_2$ glass and having an outer diameter of 7.8 mm and a length of 200 mm with one end having a large diameter of 9 mm was inserted in each bore and fixed to the preform by using the one end having the large diameter as shown in FIG. 5.

After removing impurities from the interiors of the bores, the interiors of the bores were evacuated and the free end of the glass tube 5 was fused and sealed to obtain a preform for a polarization retaining optical fiber.

The produced preform was heated with a resistance furnace and drawn to fabricate an optical fiber having an outer diameter of 125 $\mu$m while integrating the stressing member with the cladding part.

The cross sectional structure of the fabricated optical fiber was measured to find that the outer diameter of the stressing member was 20 $\mu$m which was much smaller than a designed size of 40 $\mu$m.

Figure 6:
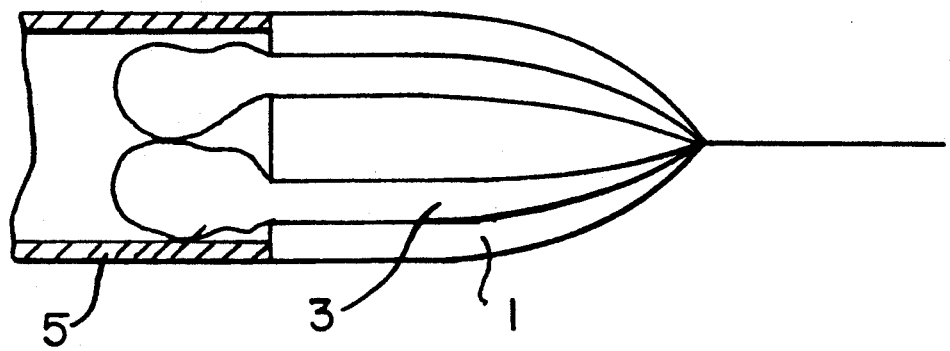

When the residual preform was observed after the fabrication of the optical fiber, the stressing member 3 was squeezed out from the ends of the bores as shown in FIG. 6.

The fabricated optical fiber had a birefringence of $3 \times 10^{-4}$ at a wavelength of 0.85 $\mu$m. In addition, a cross talk per 1 km was $-12$ dB at a wavelength of 0.85 $\mu$m. These results are not satisfactory as the polarization retaining optical fiber.

The method of the present invention may be used in the production of a rod-in-tube type preform for an optical fiber.

What is claimed is:

1. A method for producing a preform for a polarization retaining optical fiber which comprises steps of:
    making at least two bores positioned symmetrically around a center axis of a preform comprising a core part and a cladding part which surrounds the core part,
    connecting one end of a glass tube to one end of said preform, said glass tube having a part with a smaller inner diameter near its one end which is connected to said preform,
    inserting a first glass rod, a stressing member and a second glass rod in this order into each bore through the end of each bore which is remote from said connected glass tube having said smaller diameter part,
    contacting said first glass rod to said part of said glass tube with a smaller inner diameter, and
    heating and fusing said second glass rod to said preform to thereby form said preform for a polarization retaining optical fiber.

2. The method according to claim 1, wherein said glass tube having a part with a smaller inner diameter is formed by heating a part of said glass tube, softening said part and then pressing said softened part.

3. The method according to claim 1, wherein said glass tube having a part with a smaller inner diameter is formed by connection of a pair of glass tubes each having a larger inner diameter with both ends of a glass tube having a smaller inner diameter.

* * * * *

UNITED STATES PATENT AND TRADEMARK OFFICE
CERTIFICATE OF CORRECTION

PATENT NO. : 5,160,522

DATED : November 3, 1992

INVENTOR(S) : Masahiro Takagi et al

It is certified that error appears in the above-identified patent and that said Letters Patent is hereby corrected as shown below:

On the Title page, item [21]

Please Change:

"(21)  Appl. No.:  241,043"

to

----(21)  Appl. No.:  741,043---

Signed and Sealed this

Nineteenth Day of October, 1993

BRUCE LEHMAN

Attest:

Attesting Officer

Commissioner of Patents and Trademarks